US012616209B2

(12) United States Patent
Zhang et al.

(10) Patent No.: US 12,616,209 B2
(45) Date of Patent: May 5, 2026

(54) STIRRING DEVICE AND HOUSEHOLD DOUGH MIXER

(71) Applicant: SOUTHWEST JIAOTONG UNIVERSITY, Chengdu (CN)

(72) Inventors: Zeqiang Zhang, Chengdu (CN); Yang Tuo, Chengdu (CN); Zongxing He, Chengdu (CN); Shuai Chen, Chengdu (CN); Can Wang, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 954 days.

(21) Appl. No.: 17/872,794

(22) Filed: Jul. 25, 2022

(65) Prior Publication Data

US 2022/0361508 A1 Nov. 17, 2022

(30) Foreign Application Priority Data

Dec. 14, 2021 (CN) .......................... 202111526476.5

(51) Int. Cl.
*A21C 1/02* (2006.01)
*A21C 1/14* (2006.01)

(52) U.S. Cl.
CPC .............. *A21C 1/02* (2013.01); *A21C 1/1405* (2013.01)

(58) Field of Classification Search
CPC ......... A21C 1/02; A21C 1/1405; B01F 27/83; B01F 27/0721; B01F 27/0541
See application file for complete search history.

(56) References Cited

U.S. PATENT DOCUMENTS

| | | | | | |
|---|---|---|---|---|---|
| 2,692,125 | A | * | 10/1954 | Light | ...................... B01F 31/42 |
| | | | | | 74/25 |
| 2004/0145965 | A1 | * | 7/2004 | Chan | ................... B01F 27/0541 |
| | | | | | 366/326.1 |
| 2021/0378450 | A1 | * | 12/2021 | Han | ...................... A47J 43/044 |

FOREIGN PATENT DOCUMENTS

| | | | | |
|---|---|---|---|---|
| CN | 108201828 | A | 6/2018 | |
| CN | 208809931 | U | 5/2019 | |
| CN | 112957967 | A | 6/2021 | |
| EP | 0232700 | A2 * | 8/1987 | ........... C05F 17/964 |
| JP | 55159811 | A * | 5/1979 | |
| LU | 88013 | A1 * | 6/1992 | .............. B01F 27/83 |

* cited by examiner

*Primary Examiner* — Marc C Howell

(57) ABSTRACT

A stirring device and a household dough mixer. The stirring device includes a rotating plate, an annular sliding plate, a stirring rod, a rotating disk, a main motor, a deceleration device and a transmission assembly. The rotating plate is provided with a groove. Opposite inner sides of the groove are both provided with a sliding slot. The annular sliding plate is provided with an opening, and arranged inside the groove. The stirring rod is arranged on the annular sliding plate. The rotating disk is connected to the annular sliding plate, and is connected to an output shaft of the main motor. The deceleration device is arranged between the rotating plate and the rotating disk. The transmission assembly is arranged between the sliding slot and the rotating disk. The rotating disk rotates to drive the annular sliding plate through the transmission assembly to reciprocate along the sliding slot.

7 Claims, 3 Drawing Sheets

1

STIRRING DEVICE AND HOUSEHOLD DOUGH MIXER

CROSS-REFERENCE TO RELATED APPLICATIONS

This application claims the benefit of priority from Chinese Patent Application No. 202111526476.5, filed on Dec. 14, 2021. The content of the aforementioned application, including any intervening amendments thereto, is incorporated herein by reference in its entirety.

TECHNICAL FIELD

This application relates to material stirring devices, and more particularity to a stirring device and a household dough mixer.

BACKGROUND

Regarding the traditional stirring device, the stirrer is usually fixed, and equipped with a paddle for mixing. This stirring device can allow the mixing of ordinary materials, but generally fails to enable the even mixing of high-viscosity materials, such as aqueous flour dispersion and paint. Hence, considerable effort has been paid to design and develop a stirring device with a stirrer capable of moving laterally or vertically.

Chinese patent application publication No. 112957967A provides a multi-dimensional stirring device for anti-sedimentation reciprocating stirring of compounded slurry, where a lateral pushing device and a device capable of performing vertical reciprocating circular motion are provided such that the multi-dimensional stirring is enabled, allowing for an improved mixing effect. Whereas, it is limited by complicated structure and demand for multiple motors. Chinese patent No. 2088099310 provides a western medicine compounding device based on lateral reciprocating stirring, which also relies on the simultaneous operation of multiple motors. Chinese patent application publication No. 108201828A discloses a reciprocating paint mixing device, in which a sliding slot is provided for the left-right reciprocating motion of a stirrer, so as to enable the even mixing. Nevertheless, multiple motors are also required.

SUMMARY

Accordingly, an object of the present disclosure is to provide a stirring device, which only uses one motor to enable the left-right reciprocating motion, reducing the energy consumption and weight. Therefore, the stirring device provided herein has a brilliant application prospect.

Technical solutions of the disclosure are described as follows.

In a first aspect, the present disclosure provides a stirring device, comprising:

a rotating plate;
an annular sliding plate;
a stirring rod;
a rotating disk;
a main motor;
a deceleration device; and
a transmission assembly;
wherein the rotating plate is provided with a groove; and opposite inner sides of the groove are both provided with a sliding slot;

the annular sliding plate is provided with an opening; the annular sliding plate is arranged inside the groove; and the annular sliding plate is configured to slid along the sliding slot;

the stirring rod is arranged on the annular sliding plate; the rotating disk is connected to the annular sliding plate; an output shaft of the main motor is connected to the rotating disk to drive the rotating disk to rotate;

the output shaft of the main motor is connected to the rotating plate through the deceleration device to drive the rotating plate to rotate; and a rotation angular velocity of the rotating plate is different from a rotation angular velocity of the rotating disk; and the transmission assembly is arranged between the sliding slot and the rotating disk; and the rotating disk is configured to rotate to drive the annular sliding plate through the transmission assembly to reciprocate along the sliding slot.

In some embodiments, the deceleration device comprises a sun gear, two planetary gears, a coupling, a stepped shaft and an internal gear ring; one end of the stepped shaft is connected to the output shaft of the main motor through the coupling; the sun gear is sleevedly arranged at the other end of the stepped shaft; the rotating disk is sleevedly arranged at the stepped shaft, and is located between the coupling and the sun gear; the two planetary gears and the sun gear are arranged inside the internal gear ring; the two planetary gears are arranged symmetrically with respect to a center of the sun gear; the two planetary gears are engaged between the internal gear ring and the sun gear; and the internal gear ring is connected to the rotating plate to drive the rotating plate to rotate.

In some embodiments, the transmission assembly comprises a clamping column and a clamping assembly; the clamping column is arranged at the rotating disk; the clamping assembly is arranged at the annular sliding plate; and the clamping column is engaged with the clamping assembly for transmission.

In some embodiments, the clamping assembly comprises a first clamping assembly and a second clamping assembly; the first clamping assembly is arranged on a first inner side wall of the sliding slot; the second clamping assembly is arranged on a second inner side wall of a second side of the sliding slot; and the first inner side wall of the sliding slot is opposite to the second inner side wall of the sliding slot.

In some embodiments, the first clamping assembly includes at least two clamping parts; a clamping groove is provided between two adjacent clamping parts; the clamping groove is configured to correspond to the clamping column; and the clamping column is engaged with the clamping groove for transmission.

In some embodiments, the second clamping assembly comprises at least two clamping parts; a clamping groove is provided between two adjacent clamping parts; the clamping groove is configured to correspond to the clamping column; and the clamping column is engaged with the clamping groove for transmission.

In a second aspect, the present disclosure provides a household dough mixer, comprising:

the above-mentioned stirring device;
wherein the stirring device is arranged on a frame; a mixing container is provided at a lower portion of the frame; the stirring rod of the stirring device is configured to extend into the mixing container; the frame is further provided with a first storage cylinder and a second storage cylinder; the first storage cylinder is arranged at one side of the mixing container, and the second storage cylinder is arranged at the other side of the mixing container; and the first storage cylinder is opposite to the second storage cylinder.

the present disclosure has the following beneficial effects.

The main motor is configured to drive the rotating disk to rotate, and drive the rotating plate to rotate through the deceleration device. Consequently, the rotation angular velocity of the rotating plate is different from that of the rotating disk. When the rotating disk rotates, the annular sliding plate is driven through the transmission assembly, so as to move along the sliding slot, such that the stirring rod can make a lateral movement with respect to the rotating plate. The stirring device provided herein enables the lateral movement of the stirring rod with respect to the rotating plate through a simple structure. The stirring rod is capable of rotating around the output shaft of the main motor for a better mixing of materials. Further, the stirring device provided herein is free from multiple motors, merely requiring the main motor to stir, which has a lower energy consumption, lighter weight and multiple applications. A household dough mixer using the stirring device, compared to traditional hand kneading, is more labor-saving, meanwhile, a dough has a better taste due to its better mixing.

BRIEF DESCRIPTION OF THE DRAWINGS

Technical solutions of the present disclosure will be described below with reference to the accompany drawings to facilitate the understanding. It should be understood that presented in the accompany drawings are merely some embodiments of the present disclosure, which are not intended to limit the disclosure. Obviously, other related accompany drawings can be obtained by those skilled in the art based on the drawings provided herein without paying creative effort.

Figure 1:
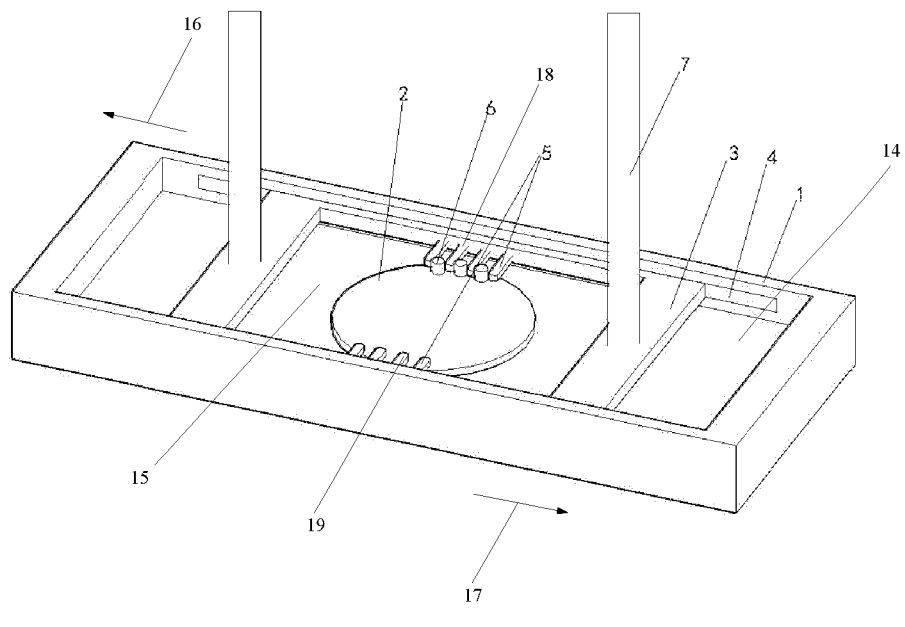
FIG. 1 schematically depicts a structure of a stirring device according to an embodiment of the present disclosure (main motor is absent)

In the drawings: 1, rotating plate; 2, rotating disk; 3, annular sliding plate; 4, sliding slot; 5, clamping part; 6, clamping column; 7, stirring rod; 8, main motor; 9, deceleration device; 91, sun gear; 92, planetary gear; 93, coupling; 94, stepped shaft; 95, internal gear ring; 10, first storage cylinder; 11, second storage cylinder; 12, mixing container; 13, frame; 14, groove; 15, opening; 16, first direction; 17, second direction; 18, first clamping assembly; and 19, second clamping assembly.

DETAILED DESCRIPTION OF EMBODIMENTS

Technical solutions of the present disclosure will be clearly and completely described below with reference to the embodiments and accompanying drawings.

Obviously, described below are merely some embodiments of this disclosure, and are not intended to limit the disclosure. Other embodiments obtained by those skilled in the art based on the embodiments provided herein without paying any creative effort should fall within the scope of the present disclosure.

In this disclosure, the "annular sliding plate" refers to an annular provided with an opening at the center and capable of sliding in a sliding slot.

In this disclosure, the "deceleration device" is configured to produce speed difference between two parts.

Referring to FIG. 1, a stirring device is provided, including: a rotating plate 1, an annular sliding plate 3, a stirring rod 7, a rotating disk 2, a main motor 8, a deceleration device 9 and a transmission assembly. The rotating plate 1 is provided with a groove 14. Opposite inner sides of the groove 14 are both provided with a sliding slot 4. The annular sliding plate 3 is provided with an opening 15 at the center. The annular sliding plate 3 is arranged inside the groove 14. Opposite sides of the annular sliding plate 3 is embedded in the sliding slot 4. The annular sliding plate 3 is configured to slid along the sliding slot 4. The stirring rod 7 is arranged on the annular sliding plate 3. The rotating disk 2 is connected to the annular sliding plate 3. An output shaft of the main motor 8 is connected to the rotating disk 2 to drive the rotating disk 2 to rotate. The output shaft of the main motor 8 is connected to the rotating plate 1 through the deceleration device 9 to drive the rotating plate 1 to rotate. A rotation angular velocity of the rotating plate 1 is different from a rotation angular velocity of the rotating disk 2 The transmission assembly is arranged between the sliding slot 4 and the rotating disk 2. The rotating disk 2 is configured to rotate to drive the annular sliding plate 3 through the transmission assembly to reciprocate along the sliding slot 4.

The main motor 8 is configured to drive the rotating disk 2 to rotate. The main motor 8 is also configured to drive the rotating plate 1 to rotate through the deceleration device 9. By means of the deceleration device 9, a rotation angular velocity of the rotating plate 1 is different from that of the rotating disk 2, such that the rotating disk 2 can rotate to drive the annular sliding plate 3 to move along the sliding slot 4 through the transmission assembly, so as to enable the lateral movement of the stirring rod 7 with respect to the rotating plate 1. The stirring device provided herein enables the lateral movement of the stirring rod 7 with respect to the rotating plate 1 through a simple mechanical structure. The stirring rod 7 is capable of rotating around the output shaft of the main motor 8 for better mixing of materials. Further, regarding the stirring device provided herein, it merely requires the main motor 8 instead of multiple motors, reducing the energy consumption and weight. Compared to the manual kneading, a household dough mixer equipped with the stirring device facilitates reducing the labor intensity and improving the taste due to the enhanced mixing effect.

Specifically, the output shaft of the main motor 8 is connected to a center of the rotating disk 2.

In an embodiment, the rotating plate 1 is rectangular. A cross section of the groove 14 is rectangular. The annular sliding plate 3 is also rectangular. The opening 15 also has a rectangular cross section, and makes the annular sliding plate 3 hollow.

Figure 2:
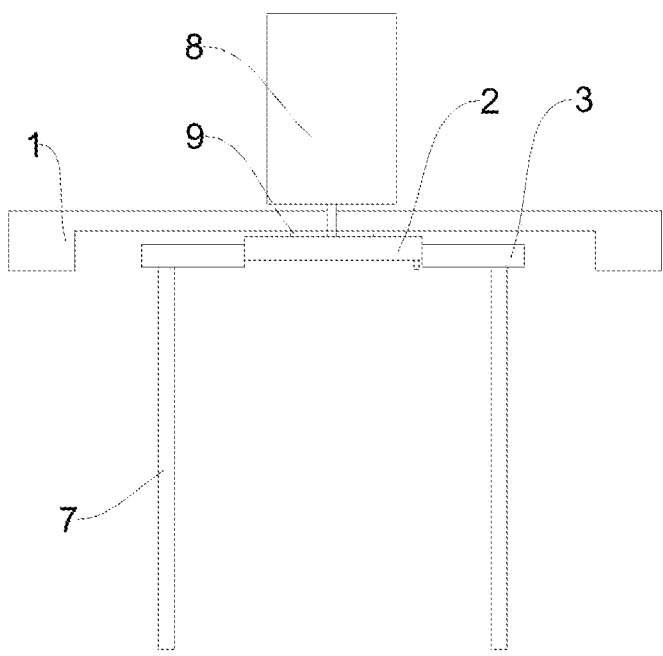
FIG. 2 is a sectional view of the stirring device according to an embodiment of the present disclosure.

In an embodiment, two stirring rods 7 are provided. The two stirring rods 7 are respectively arranged at opposite sides of the annular sliding plate 3, where the opposite sides are perpendicular to the sliding slot 4. The two stirring rods 7 are perpendicular to a plane in which the annular sliding plate 3 is located. As shown in FIGS. 1-2, the rotating plate 1 is configured as a carrier for the rotating disk 2, the annular sliding plate 3 and the two stirring rods 7.

Figure 4:
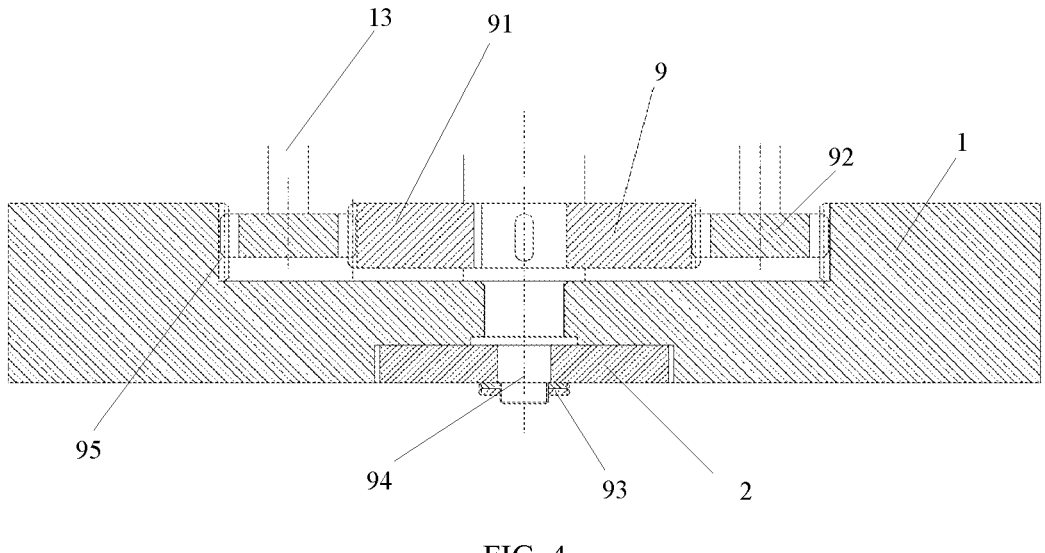
FIG. 4 schematically depicts a deceleration device according to an embodiment of the present disclosure.

Referring to FIG. 4, the deceleration device includes a sun gear 91, two planetary gears 92, a coupling 93, a stepped shaft 94 and an internal gear ring 95. One end of the stepped shaft 94 is connected to the output shaft of the main motor 8 through the coupling 93. The sun gear 91 is sleevedly arranged at the other end of the stepped shaft 94. The rotating disk 2 is sleevedly arranged at the stepped shaft 94, and is located between the coupling 93 and the sun gear 91. The two planetary gears 92 and the sun gear 91 are arranged inside the internal gear ring 95. The two planetary gears 92 are arranged symmetrically with respect to a center of the sun gear 91. The two planetary gears 92 are engaged between the internal gear ring 95 and the sun gear 91. The internal gear ring 95 is connected to the rotating plate 1 to drive the rotating plate 1 to rotate.

Since the rotation angular velocity of the rotating plate 1 is different from that of the rotating disk 2, when the rotating disk 2 and the rotating plate 1 have a speed difference, the annular sliding plate 3 can perform the left-right reciprocating motion with respect to the rotating plate 1 under an action of the rotating disk 2. Therefore, the rotating disk 2 is connected to the output shaft of the main motor 8, and the rotating plate 1 is connected to the output shaft of the main motor 8 through the deceleration device 9. Since the sun gear 91 is arranged in the internal gear ring 95, a diameter of the internal gear ring 95 is then larger than that of the sun gear 91. Since two engaging gears have the same linear velocity and a diameter of gear is inversely proportional to a rotation angular velocity of gear, a rotation angular velocity of the sun gear 91 is greater than that of the internal gear ring 95. Since the rotating disk 2 and the sun gear 91 are connected to the output shaft of the main motor 8, the rotation angular velocity of the rotating disk 2 is the same to the rotation angular velocity of the sun gear 91. The internal gear ring 95 drives the rotating plate 1 to rotate, thus the rotation angular velocity of the rotating plate 1 is lower than that of the rotating disk 2. In consequence, the rotation angular velocity of the rotating plate 1 is different from that of the rotating disk 2, so as to enable the rotating disk 2 to rotate with respect to the rotating plate 1, thereby providing power for the left-right reciprocating motion of the annular sliding plate 3.

Specifically, the internal gear ring 95 is arranged in the groove 14 of the rotating plate 1.

Referring to FIG. 1, the transmission assembly includes a clamping column 6 and a clamping assembly. The clamping column 6 is arranged at the rotating disk 2. The clamping assembly is arranged at the annular sliding plate 3. The clamping column 6 is engaged with the clamping assembly.

Specifically, the rotating disk 2 is cylindrical. The rotating disk 2 includes a top surface, a bottom surface and a side surface arranged between the top surface and the bottom surface. The bottom surface of the rotating disk 2 is arranged far away from the main motor 8. The clamping column 6 is arranged vertically on the bottom surface of the rotating disk 2. The clamping column 6 is circumferentially arranged at an edge of the rotating disk 2.

Referring to FIG. 1, the clamping assembly includes a first clamping assembly 18 and a second clamping assembly 19. The first clamping assembly 18 is arranged on a first inner side wall of the sliding slot 4. The second clamping assembly 19 is arranged on a second inner side wall of the sliding slot 4. The first inner side wall of the sliding slot 4 is opposite to the second inner side wall of the sliding slot 4.

Referring to FIG. 1, the first clamping assembly 18 includes at least two clamping parts 5. A clamping groove is provided between two adjacent clamping parts 5. The clamping groove is configured to correspond to the clamping column 6. The clamping column 6 is engaged with the clamping groove for transmission.

Referring to FIG. 1, the second clamping assembly 19 includes at least two clamping parts 5. A clamping groove is provided between two adjacent clamping parts 5. The clamping groove is configured to correspond to the clamping column 6. The clamping column 6 is engaged with the clamping groove for transmission.

Specifically, when the main motor 8 drives the rotating disk 2 to rotate, the clamping column 6 on the rotating disk 2 rotates synchronously. When the clamping column 6 is engaged with the clamping groove of the first clamping assembly 18, the clamping column 6 pushes the first clamping assembly 18 to move along a first direction of the sliding slot 4, so as to drive the annular sliding plate 3 to move along the first direction 16 of the sliding slot 4. When the clamping column 6 rotates to and is engaged with the clamping groove of the second clamping assembly 19, the clamping column 6 pushes the second clamping assembly 19 to move along a second direction 17 of the sliding slot 4. The first direction 16 is opposite to the second direction 17. In consequence, the stirring rod 7 can perform a lateral movement with respect to the rotating plate 1.

Specifically, the clamping column 6 is cylindrical to be better engaged with the clamping groove to facilitate the transmission therebetween.

The rotating disk 2 is provided with at least one clamping column 6. As for some small viscosity materials, only one clamping column 6 is arranged to make a simple structure. As for some large viscosity materials, a force exerted by the rotating disk 2 on the annular sliding plate 3 is difficult to overcome a reaction force exerted by the materials on the stirring rod 7 if arranging only one clamping column 6, thus multiple clamping columns 6 should be arranged. The multiple clamping columns 6 can be arranged in any manner as long as at least one clamping column 6 corresponds to one clamping groove.

Whereas, in an embodiment, considering a force balance, when multiple clamping columns 6 and clamping grooves are provided, the clamping columns 6 are uniformly arranged along the circumference of the rotating disk 2 with respect to a dot of the rotating disk 2, and an arc angle formed between two furthest apart clamping columns 6 is less than 90°. The number of the clamping groove of the first clamping assembly 18 and that of the clamping groove of the second clamping assembly 19 are both the same to the number of the clamping columns 6 on the rotating disk 2. When the rotating disk 2 rotates to the first clamping assembly 18 or the second clamping assembly 19, the clamping columns 6 on the rotating disk 2 contacts with the clamping groove of the first clamping assembly 18 or the clamping groove of the second clamping assembly 19 in sequence, so as to push the annular sliding plate 3 to perform lateral movement. During use, the main motor is firstly started. The output shaft of the main motor 8 rotates to drive the rotating disk 2 and the rotating plate 1 to rotate, so as to drive the annular sliding plate 3 to rotate. Then the stirring rod 7 arranged at the annular sliding plate 3 also rotates to stir the materials.

Since there is a speed difference between the rotating disk 2 and the rotating plate 1, when the clamping column 6 on the rotating disk 2 contacts with the clamping parts 5 of the first clamping assembly 18, the annular sliding plate 3 moves along the first direction 16 of the sliding slot 4 with respect to the rotating plate 1 under an action of the rotating disk 2. When the rotating disk 2 rotates with respect to the rotating plate 1 and the clamping column 6 contacts with the clamping parts 5 of the second clamping assembly 19 of the annular sliding plate 3, the annular sliding plate 3 moves along the second direction 17 of the sliding slot 4. Since the rotating disk 2 rotates continuously, the annular sliding plate 3 can perform the left-right reciprocating motion. Under the left-right reciprocating motion of the annular sliding plate 3 and a circumferential motion around the output shaft of the main motor 8, the stirring rod 7 stirs the materials better.

Figure 3:
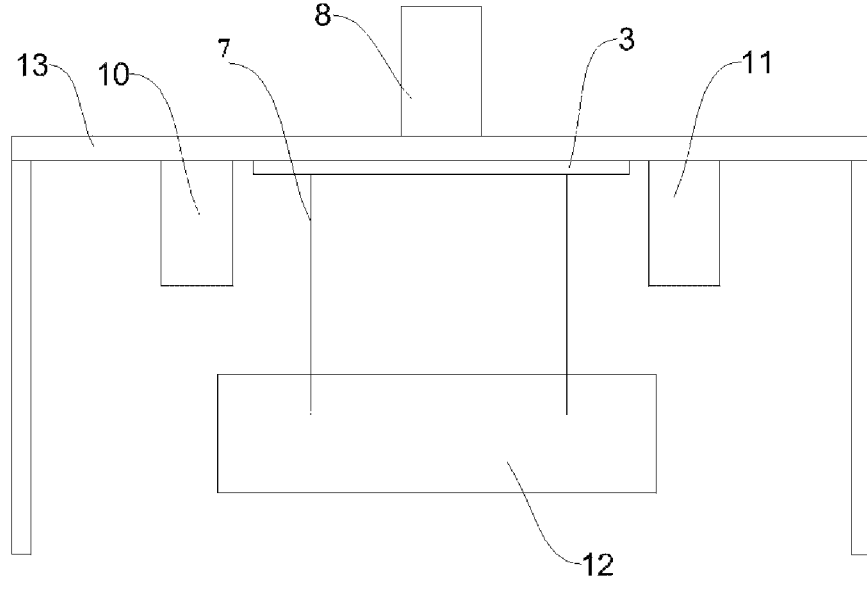
FIG. 3 schematically depicts a structure of a household dough mixer according to an embodiment of the present disclosure.

A household dough mixer is shown in FIG. 3. The household dough mixer includes the above-mentioned stirring device. The stirring device is arranged on a frame 13. A mixing container 12 is provided at a lower portion of the frame 13. The stirring rod 7 of the stirring device is configured to extend into the mixing container 12. The frame 13 is further provided with a first storage cylinder 10 and a second storage cylinder 11. The first storage cylinder 10 is arranged at one side of the mixing container 12. The second storage cylinder 11 is arranged at the other side of the mixing container 12. The first storage cylinder 10 is opposite to the second storage cylinder 11. In an embodiment, the mixing container 12 is a pot or a barrel.

Specifically, centers of two planetary gears 92 are both connected to the frame 13, such that the two planetary gears 92 can perform a fixed-axis rotation to enable the internal gear ring 95 to rotate around an axial direction of the stepped shaft 94, thereby driving the rotating plate 1 to rotate. Specifically, the first storage cylinder 10 is configured to store water, and the second storage cylinder 11 is configured to store flour.

During use, water and flour are fed in proportion to the mixing container 12, and then the stirring device is started for stirring.

It should be noted that as used herein, directional and positional relationship indicated by terms, such as "up", "down", "left", "right", "front", "rear", "top", "bottom", "inner" and "outer", are merely illustrative instead of indicating or implying that the device or element referred to must have a specific orientation, be constructed and operated in a specific orientation. Therefore, theses directional indications should not be construed as a limitation to the present disclosure.

Mentioned above are merely preferred embodiments of this disclosure, and not intended to limit the scope of the present disclosure. It should be understood that any changes, modifications and replacements made by those killed in the art without departing from the spirit of this disclosure should fall within the scope of the present disclosure defined by the appended claims.

What is claimed is:

1. A stirring device, comprising:
a rotating plate;
an annular sliding plate;
a stirring rod;
a rotating disk;
a main motor;
a deceleration device; and
a transmission assembly;
wherein the rotating plate is provided with a groove; and opposite inner sides of the groove are both provided with a sliding slot;
the annular sliding plate is provided with an opening; the annular sliding plate is arranged inside the groove; and the annular sliding plate is configured to slide along the sliding slot;
the stirring rod is arranged on the annular sliding plate;
the rotating disk is connected to the annular sliding plate;

an output shaft of the main motor is connected to the rotating disk to drive the rotating disk to rotate;
the output shaft of the main motor is connected to the rotating plate through the deceleration device to drive the rotating plate to rotate; and a rotation angular velocity of the rotating plate is different from a rotation angular velocity of the rotating disk; and
the transmission assembly is arranged between the sliding slot and the rotating disk; and the rotating disk is configured to rotate to drive the annular sliding plate through the transmission assembly to reciprocate along the sliding slot.

2. The stirring device of claim 1, wherein the deceleration device comprises a sun gear, two planetary gears, a coupling, a stepped shaft and an internal gear ring; one end of the stepped shaft is connected to the output shaft of the main motor through the coupling; the sun gear is sleevedly provided at the other end of the stepped shaft; the rotating disk is sleevedly arranged at the stepped shaft, and is located between the coupling and the sun gear; the two planetary gears and the sun gear are arranged inside the internal gear ring; the two planetary gears are arranged symmetrically with respect to a center of the sun gear; the two planetary gears are engaged between the internal gear ring and the sun gear; and the internal gear ring is connected to the rotating plate to drive the rotating plate to rotate.

3. The stirring device of claim 1, wherein the transmission assembly comprises a clamping column and a clamping assembly; the clamping column is arranged at the rotating disk; the clamping assembly is arranged at the annular sliding plate; and the clamping column is engaged with the clamping assembly.

4. The stirring device of claim 3, wherein the clamping assembly comprises a first clamping assembly and a second clamping assembly; the first clamping assembly is arranged on a first inner side wall of the sliding slot; the second clamping assembly is arranged on a second inner side wall of the sliding slot; and the first inner side wall of the sliding slot is opposite to the second inner side wall of the sliding slot.

5. The stirring device of claim 4, wherein the first clamping assembly comprises at least two clamping parts; a clamping groove is provided between two adjacent clamping parts of the at least two clamping parts; the clamping groove is configured to correspond to the clamping column; and the clamping column is engaged with the clamping groove.

6. The stirring device of claim 4, wherein the second clamping assembly comprises at least two clamping parts; a clamping groove is provided between two adjacent clamping parts of the at least two clamping parts; the clamping groove is configured to correspond to the clamping column; and the clamping column is engaged with the clamping groove.

7. A household dough mixer, comprising:
the stirring device of claim 1;
wherein the stirring device is arranged on a frame; a mixing container is provided at a lower portion of the frame; the stirring rod of the stirring device is configured to extend into the mixing container; the frame is further provided with a first storage cylinder and a second storage cylinder; the first storage cylinder is arranged at one side of the mixing container, and the second storage cylinder is arranged at the other side of the mixing container; and the first storage cylinder is opposite to the second storage cylinder.

* * * * *